L. W. FARMER,
BAKING DISH,
APPLICATION FILED FEB. 18, 1915.

1,295,466.

Patented Feb. 25, 1919.

Witnesses:
H. B. Davis.
R. Cornell.

Inventor:
Luke W. Farmer
by Noyes & Harriman
attys.

UNITED STATES PATENT OFFICE.

LUKE W. FARMER, OF SOMERVILLE, MASSACHUSETTS.

BAKING-DISH.

1,295,466.     Specification of Letters Patent.     Patented Feb. 25, 1919.

Application filed February 18, 1915. Serial No. 8,975.

*To all whom it may concern:*

Be it known that I, LUKE W. FARMER, a citizen of the United States, residing at Somerville, in the county of Middlesex and State of Massachusetts, have invented an Improvement in Baking-Dishes, of which the following is a specification.

At the present time it is customary to bake pies in sheet-metal plates, which are thoroughly greased to prepare them for baking, and then to remove the pies and place them on paper plates for shipment. On account of health regulations in many places, as well as from a sanitary standpoint, great care is exercised in cleansing and otherwise preparing the metal plates for baking, and also great care must be taken in removing the pies from the metal plates and placing them on the paper plates to avoid breaking them.

The ordinary paper plates of commerce have a tendency to absorb the grease and moisture from the pies, and as a result a pie is frequently condemned as stale, when as a matter of fact, it is quite fresh.

This invention has for its object the construction of a paper plate which may be employed for baking purposes, which will not require greasing or any other preliminary treatment to prepare it for baking purposes, and which when the pie is baked will not necessitate the removal of the pie, as it may be used as the container for the pie while being shipped, and such use may be continued up to the moment of delivery to the customer, and what is of still greater importance will not absorb the moisture or grease from the pie.

The plate embodying this invention consists of a piece of paper cut and molded to the desired form and saturated with a soft, unctuous, odorless and tasteless substance, such for instance, as petroleum jelly commercially known as petrolatum, which is well suited to the purpose, although other similar lubricants of a more or less plastic consistency may be employed.

In the manufacture of the plates, a strip of paper of fairly good quality, as regards strength and thickness, is passed through petroleum jelly which is liquefied by heat, or the liquefied petroleum jelly may be sprayed thereon in sufficient quantity to enable the paper to become saturated, and then while the paper is thus saturated with the hot lubricant and is in temper, it is subjected to the action of suitable dies by which it is cut and molded, and then the cut and molded plate is allowed to cool, whereupon the liquefied petroleum jelly solidifies, and the molded plate permanently retains its form.

Figure 1:
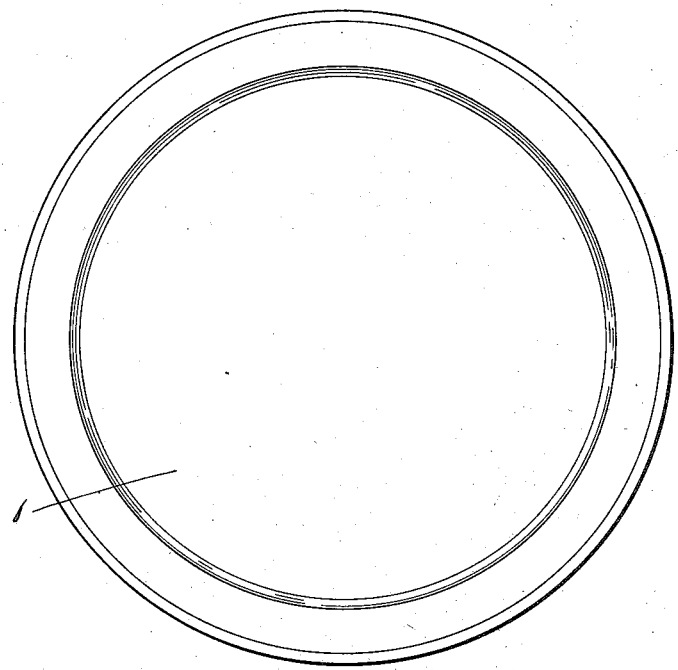
Figure 1, is a plan view of a baking dish or plate embodying this invention.
Figure 2:
Fig. 2, is a side view of the same.
Figure 3:
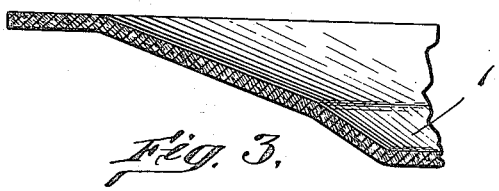
Fig. 3, is an enlarged sectional view of a fragment of the dish or plate.

The plate 1, may be of any suitable shape and dimension, and while a plate especially adapted for pies is here shown, it is obvious that it may be made of suitable shape to adapt it for cake and other things.

The paper which is selected is of a good substantial quality as regards strength and thickness and is capable of absorbing the lubricant which it is proposed to employ. The lubricant herein employed is petroleum jelly, which is a well-known petroleum product and commonly sold on the market under the name of petrolatum, and which liquefies at a moderately high temperature, and solidifies at a moderately low temperature. This substance is well suited to the purpose because it is soft, unctuous, odorless, and tasteless, but in lieu thereof other similar lubricants may be employed. In the manufacture of the plate or dish a strip of paper is saturated with the lubricant by submerging it in or passing it through the lubricant while the latter is heated and is in liquid form, or the liquefied lubricant may be sprayed thereon. In either case the paper becomes quite thoroughly saturated. While thus saturated and heated by the hot liquefied lubricant and consequently in temper, it is subjected to the action of suitable dies by which it is cut and molded to the form shown in the drawing, or to any other suitable form depending upon the uses to which it is to be put. The plate or dish is then allowed to cool whereupon the liquefied lubricant congeals or solidifies. The unbaked pie is placed on this plate, and the plate with the unbaked pie thereon is placed in an oven and baked in the usual manner. By reason of the lubricant with which the paper is saturated the pie will not stick to the plate; nor will the grease and moisture of the pie be absorbed by the plate. When the pie is removed from the oven, it is not removed from the plate, but is shipped with the plate, and delivered to a purchaser in this manner. Even though the pie should remain on the plate for several days, the plate thus treated will not absorb the moisture from the pie, and as a result the drying up of the pie will not be accelerated by the plate. Nor in fact will the plate absorb moisture from the air and impart such moisture to the pie, both characteristics being of importance.

Reference has been made herein particularly to petrolatum as the lubricant or substance with which the paper is treated to the substantial point of saturation for the use described. Petrolatum possesses characteristics which are of particular importance in the invention, the prime essential advantage of such material residing in the fact that at normal temperature it has an appreciable viscous tendency. It is in this characteristic that the essential feature of the invention resides, for incident to such characteristic it is apparent that the juncture between the baking dish and pie or other article therein is, in effect, sealed against the entrance of air. If the air is prevented from coming into direct contact with the bottom of the article in the baking dish the evaporation of the moisture is very much less rapid than would otherwise be the case, and hence the article in the dish remains fresh for a greater length of time. Therefore, petrolatum, possessing this characteristic, as well as capability of saturating the material of the baking dish so that such material will not absorb the moisture from the article, is particularly advantageous for the purpose of this invention, and while said substance is specifically mentioned and claimed herein it is, of course, understood that any substance possessing the specific characteristics noted may be used.

I claim:

As a new article of manufacture, a baking dish or the like composed of fibrous material impregnated to a substantial point of saturation with petrolatum and adapted to serve both as the baking dish and as the dish for thereafter containing the article in its subsequent handling and selling.

In testimony whereof, I have signed by name to this specification, in the presence of two subscribing witnesses.

LUKE W. FARMER.

Witnesses:
   ELIZABETH M. HANSON,
   AMOS L. TAYLOR.